Feb. 12, 1924.

H. E. WARREN

GOVERNING MECHANISM

Original Filed Feb. 27, 1922

1,483,537

Inventor:
Henry E. Warren,
by *Alexander F. Smit*
His Attorney,

Patented Feb. 12, 1924.

1,483,537

UNITED STATES PATENT OFFICE.

HENRY E. WARREN, OF ASHLAND, MASSACHUSETTS, ASSIGNOR TO GENERAL ELECTRIC COMPANY, A CORPORATION OF NEW YORK.

GOVERNING MECHANISM.

Original application filed February 27, 1922, Serial No. 539,347. Divided and this application filed December 18, 1922. Serial No. 607,508.

*To all whom it may concern:*

Be it known that I, HENRY E. WARREN, a citizen of the United States, residing at Ashland, in the county of Middlesex, State of Massachusetts, have invented certain new and useful Improvements in Governing Mechanism, of which the following is a specification.

This application is a division of my application Serial No. 539,347 entitled "Automatic regulator" filed February 27, 1922.

In the parent application Serial No. 539,347 I have described and claimed a regulating system particularly adapted to the control of prime movers used to drive electric generators which supply in addition to the ordinary commercial load, electrically operated secondary clocks. The present application relates more in particular to the governing mechanism used in connection with such prime movers and has for its principal object to provide improved anti-racing mechanisms applicable to governors in general.

The construction and mode of operation of my invention will be understood from the following description taken in connection with the accompanying drawings, and its scope will be pointed out in the appended claims.

Figure 1:
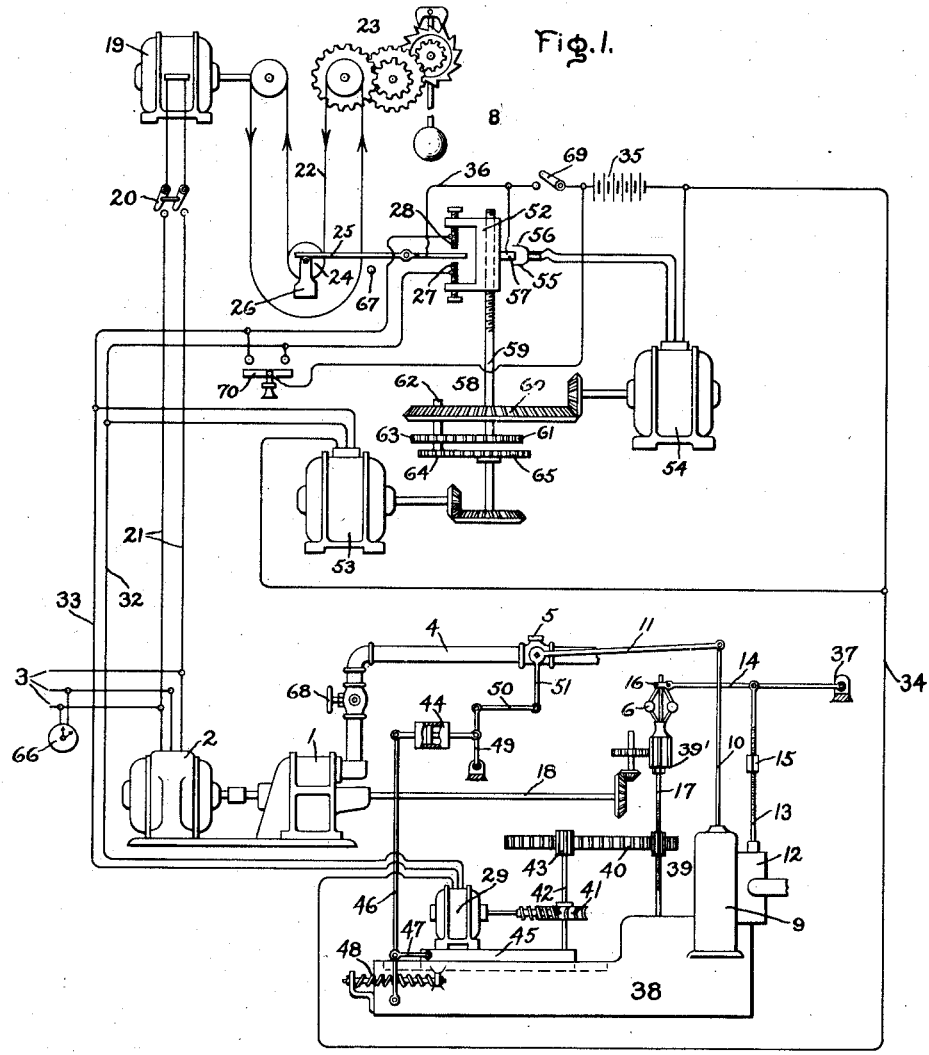
Figure 2:
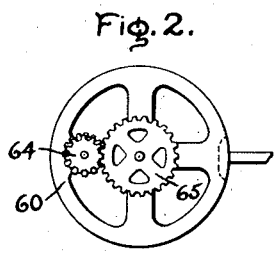
Figure 3:
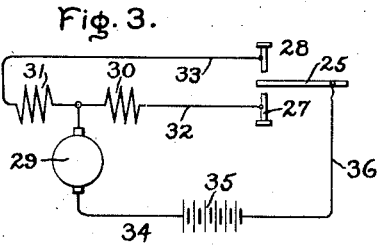

Referring to the drawings, Fig. 1 shows one arrangement of my invention as applied to the control of turbo alternators; Fig. 2 shows a detail of one of the anti-racing mechanisms; and Fig. 3 shows a simplified wiring diagram for one of the control motors shown in Fig. 1.

Referring now in particular to Fig. 1, 1 indicates a steam turbine or other prime mover driving an alternating current generator 2 supplying a system 3 which may include secondary clocks. Steam is supplied to the turbine 1 through pipe 4 and governor controlled valve 5. The opening of valve 5 and consequently the speed of the turbo alternator is automatically controlled by the combined regulating effect of a speed responsive device illustrated as a centrifugal governor 6 and a master clock regulating device designated in general at 8. The regulating effect of the centrifugal governor is of course responsive to the instantaneous speed of the turbine and the regulating effect of the clock device 8 is arranged to be responsive to accumulated errors in frequency. The centrifugal governor is normally set to maintain the speed of the turbo alternator at such a value that no appreciable error in frequency will occur, and the clock controlling mechanism is arranged to modify the setting of the governor to correct for accumulated errors in frequency when such errors exist. The regulating devices are provided with my improved anti-racing mechanism which effectively prevents the over-travel of the regulating parts and yet allows them to be quickly responsive to errors in instantaneous or average speeds.

In the present illustration I have shown a servo motor 9 for moving the valve 5 operating through piston rod 10 and lever 11. The pilot valve 12 of the motor 9 is controlled through the piston rod 13 and pivoted lever 14 by the centrifugal governor in the usual manner. The normal setting of the governor is manually adjustable such as by a nut 15 adapted when turned to vary the length of the piston rod 13. If desirable, this may be accomplished through an electric motor and remote control contacts. The upper end of the centrifugal governor 6 is provided with a collar 16 to which the lever arm 14 is attached. The collar is adapted to be moved up and down on the stationary spindle 17 by the centrifugal action of the governor. The governor is driven from the steam turbine in any suitable manner and I have diagrammatically illustrated the same as being driven from the shaft 18 of the turbine through suitable gearing. The lower end of the governor is secured to one of these gears 39 which is rotatably but non-slidably mounted on the spindle 17 in any suitable manner. As thus described, it will be evident that the speed of the turbine 1 will be controlled by the governor 6 operating through the servo motor 9 on the valve 5 in the usual manner. While I have here described a centrifugal governor operating through a servo motor, I do not wish to be limited to such an arrangement as it will be evident that any other known type of speed responsive governor will answer the same purpose.

In order to measure the accumulated errors in frequency, I make use of the device described and claimed in my application, Serial No. 414,161 filed October 2, 1920, entitled "Control systems". This device comprises a synchronous motor 19 preferably of the self-starting type, for example, such as described in my U. S. Patent 1,390,320, electrically connected to the generator 2 through switch 20 and line 21. The motor 19 drives one portion of an endless belt 22. The belt is advanced at another place in the same direction at an exactly uniform rate by a standard chronometer designated at 23. A loop is formed in the belt between the places where it is advanced by the synchronous motor 19 and the timing device 23, and in this loop rides a weighted pulley 24. When the frequency of the generator 2 is correct, the belt will be advanced at the same speeds by both the synchronous motor 19 and the timing device 23, and the pulley 24 will remain in the same horizontal position. If the frequency increases above normal, the pulley 24 will be raised and if the frequency decreases below normal, the pulley will be lowered and the amount of such movement away from a normal position will be a measure of the accumulated error in frequency. The direction in which the belt is driven for accomplishing this result is designated by the arrows thereon. When the accumulated error in frequency is zero, the pulley 24 is adjusted to have the position illustrated with respect to a pivoted switch arm 25. One end of this pivoted arm rests on the weight 26 of the pulley 24 so as to be moved up and down by the movement of the pulley when accumulated errors in frequency occur. The other end of the arm 25 cooperates with adjustable switch contacts 27 and 28 which control the circuit of a speed control motor 29 in a manner to correct for accumulated errors in frequency.

A simplified circuit diagram for the motor 29 is shown in Fig. 3. The motor may be of the direct current series type having two oppositely wound field windings 30 and 31, one side of each field winding being permanently connected to one side of the armature. The other terminals of the field windings are connected through lines 32 and 33 to contacts 27 and 28 respectively. The other side of the armature is connected to one side of the storage battery 35 or other source of energy through line 34 and the other side of the battery or source is connected through line 36 to the insulated end of pivoted lever 25. It will thus be evident that when the circuit just traced is closed between arm 25 and contact 28, the speed control motor will operate in one direction and when the circuit is closed between arm 25 and contact 27 the motor will operate in the opposite direction, and that the motor will remain stationary when the arm 25 stands at an intermediate position such as illustrated.

The speed control motor is arranged to modify the setting of the governor 6 to correct for accumulated errors in frequency. In the present illustration I have shown the motor 29 arranged to raise and lower the governor 6 with respect to the stationary pivot 37 of the governor controlled lever 14. The spindle rod 17 upon which the governor is mounted is divided between the governor and the stationary support 38. The divided ends of the spindle are threaded with right and left hand threads and are held in alignment by means of a right and left hand nut 39. The nut 39 is made of sufficient length to accommodate considerable variation in the length of the spindle 17. The exterior surface of the nut 39 constitutes a pinion with which a rack 40 cooperates. The rack 40 is moved by the speed control motor 29 through worm gear 41, shaft 42 and pinion 43. In order that the motor 29 may be made small and in order not to adjust the speed too rapidly this worm gear reduction is preferably made very large, for example, several hundred to one. The pinions 39 and 39' on spindle 17 are made of sufficient length to keep in mesh with their cooperating gear members when said pinions are adjusted longitudinally by controlling mechanisms. The direction of rotation of the motor 29 and the arrangement of the right and left hand pinion nut 39 is such that when contact is made between arm 25 and contact 28 due to a small accumulated negative error in frequency, the rack 40 will be moved to the left and the spindle 17 shortened thus lowering the governor 6, lever 14 and pilot valve piston 13. This will cause the servo motor 9 to raise its piston 10 and lever arm 11 to open the valve 5. A small positive accumulated error in frequency will reverse the direction of rotation of the speed control motor 29 to cause the opposite movement of the various parts and a corresponding closure of the valve 5.

The valve 5 is provided with an anti-racing device consisting of a dash-pot 44 connected through a system of levers between throttle valve 5 and a sliding base 45 upon which the motor 29, worm gear 41 and shaft 42 is mounted. A suitable groove is provided in the supporting frame 38 in which the base 45 may slide. The base 45 is connected to a lever 46 by a link 47. The lower end of the lever 46 is pivoted to the stationary frame 38 and is provided with a centering device consisting of springs 48 positioned between stationary supports on the frame 38. These springs tend to keep the lever 46 and the slide 45 in their central and normal positions as illustrated. The upper end of lever 46 carries the outer member of the dash-pot 44. The piston of the dash-pot is connected through lever 49 and link 50 to an arm 51 secured to the shaft of the valve 5. The lever 49 is pivoted at its lower end to a stationary support. When the valve 5 is moved toward open position by the raising of piston rod 10 and lever 11, lever 51, link 50 and lever 49 will move the piston of the dash-pot to the right. If this movement is slow and of small amount, the tendency to overspeed the turbine will not exist and the outer member of the dash-pot will not follow. However, if the movement is quick and of an amount liable to cause overspeeding of the turbine, the outer member of the dash-pot will follow to some extent and cause the lever 46 and link 47 to move sliding base 45 and the parts mounted thereon to the right. Since the worm gear 41 constitutes an irreversible drive the shaft 42 will not revolve except as it is driven by the motor 29, consequently when the base 45 is moved to the right, the rack 40 will be moved accordingly through the lateral movement of gear wheel 43. This will cause the nut 39 to turn and raise the spindle of the governor and the piston 13 of the pilot valve 12. The pilot motor 9 is thus checked and an excessive movement of the throttle valve is prevented or corrected. In like manner a too sudden closing of the throttle valve 5 is prevented by a movement of the various parts in the opposite direction. After an operation of the anti-racing mechanism just described, the centering springs 48 slowly return the lever 46 and the slide 45 to their central positions, thus gradually, the various parts of the mechanism are brought back to their normal positions. In this way, a movement of the valve 5 such as would be liable to cause an undesirable overspeeding or underspeeding of the turbine is prevented and this is true irrespective of whether the movement is caused by the speed responsive governor 6 or by the time control regulator 8. It will be evident to those skilled in the art that various obvious modifications might be made in the anti-racing device and the manner of connecting the speed control motor 29 to the governing mechanism.

I also provide the clock controlled regulator 8 with an anti-racing mechanism in order that its effect upon the governing mechanism may be smoothly and gradually applied. This anti-racing mechanism may comprise a movable frame 52 on which the contacts 27 and 28 are adjustably mounted, a circuit opening motor 53 for moving the frame 52 in a direction to open the control circuit which is closed by the up and down movement of the arm 25 and a centering motor 54 for more slowly returning the frame 52 in a direction to open the control circuit which is closed by the up or down movement of the arm 25 and to return frame 52 to its central and normal position as illustrated. The motors 53 and 54 may be similar to the motor 29 and controlled in a similar manner. The motor 53 is shown connected in multiple with motor 29 and is controlled by the same contacts 27 and 28. The motor 54 is adapted to be connected across the battery 35 through stationary contacts 55 and 56 which cooperate with a contact 57 on the movable frame 52. These contacts are normally open, but when the frame 52 is moved from its central position one of the contacts 55 or 56 is closed and the motor 54 is started in the proper direction to bring the frame 52 back to its central position and thus open the circuit of motor 54.

A convenient way of accomplishing these results is by the use of an epicyclic gear train designated in general by the numeral 58, a bottom plan view of which is shown in Fig. 2. A shaft 59 is threaded through the frame 52 and these two members are so mounted that when the shaft 59 is rotated, the frame 52 together with the switch contacts thereon will move up or down depending upon which way the shaft 59 is turned. Gear 60, which is driven by the centering motor 54, is free to rotate on this shaft and gear 61 is secured thereto. Gear 60 carries a stud 62 upon which is mounted the planetary gears 63 and 64. These last mentioned gears are fastened together but rotatably mounted on stud 62 and have a slightly different diameter, gear 63 being slightly larger than gear 64. Gear 63 meshes with gear 61 and gear 64 meshes with a gear 65 adapted to be driven by the circuit opening motor 53. This last mentioned gear is mounted concentric with shaft 59 and is slightly larger than gear 61. The operation of the epicyclic gear mechanism is as follows:—When motor 53 is stationary and motor 54 revolves, the gear 60 will revolve on shaft 59 and carry the planetary gears 63 and 64 around with it. Gear 65 being stationary will cause shaft 59 to be driven very slowly through gears 63 and 61. If, on the other hand, motor 54 remains stationary and motor 53 is rotated, gears 63 and 64 severe merely as a back gear arrangement whereby the gear 61 will run at very nearly the same speed as gear 65 and shaft 59 will thus be driven at a comparatively higher speed.

By such an arrangement no harm will be done if both motors should happen to be energized at the same time. The motors 53 and 54 will be started, stopped and reversed in the same manner as described in connection with motor 29 and of course will be connected to rotate in the proper directions to accomplish the purpose for which they are intended. I do not wish to be limited to this particular method of moving the frame 52 because other equivalent arrangements will occur to those skilled in the art.

In certain cases it might be desirable to mechanically connect the clock controlled regulator with the governing mechanism instead of through the speed control motor 29, however, I prefer to use the arrangement illustrated or some equivalent arrangement because the flexible connection allows the centrifugal governor to act without restraint upon the valve of the servo motor and does not interfere with the restoration of the valve by the anti-racing mechanism. The illustrated arrangement also permits the clock controller to be located any desired distance away from the engine room. It might be possible to dispense with the anti-racing mechanism on the governor provided this was made sufficiently sluggish, and it might be possible to dispense with the anti-racing mechanism of the master clock if its operation were sufficiently sluggish. However, a much closer and more satisfactory regulation of the instantaneous and average speed of the turbine may be had by providing quick acting controllers provided with anti-racing mechanisms. In the actual construction of my improved regulating system, it may be desirable to provide limiting switches for the motors 29 and 53 in order that they may be stopped and their circuits opened after they have been continuously operated in one direction a sufficient length of time to move their controllers to the limit of travel. This will only happen under unusual conditions. Such limiting devices are well known and may be provided if desirable. However, their description in the present application seems unnecessary.

With the system in operation, switch 20 will be closed, the secondary clocks, one of which is indicated at 66, will initially be set with the standard time piece 23 and the standard time piece will of course be accurately adjusted and frequently compared with standard time obtained from Washington or other time standardizing centers. Assuming that the system is in operation and turbine 1 running at correct speed, the position of the weighted pulley 24 and switch arm 25, being in their central position, indicates that no accumulative error in frequency exists on the alternating current system and that clock 66 is exactly correct as compared to the master clock 23. Now, let us assume a temporary shut-down of the turbine, say for five minutes. The standard time piece will continue to operate at correct speed, motor 19 will stop and the weighted pulley will descend for five minutes. The left hand end of switch arm 25 will descend with the pulley until limited by the right hand end coming against contact 28. This closes the circuit of the circuit opening motor 53 in a direction to cause said motor to move frame 52 upward. Now, since in the meantime, the pulley 24 will have descended some distance below the left hand end of arm 25, the right hand end will follow the frame and maintain the circuit of motor 53 closed until said motor is stopped by the opening of the limit switch, not shown. Instead of a limit switch for motor 53, I may provide a stop 67 for the lever 25 in which case the motor 53 will stop as soon as frame 52 and contact 28 has been moved away from the position of switch arm 25 as determined by the stop 67. The upward movement of frame 52 will close the circuit of the centering motor 54 at 56 in the proper direction to slowly return said frame to its central position. Under the conditions assumed the lever 25 will have remained against stop 67 and as soon as the frame has been returned to a position in which switch arm 25 makes contact at 28 the frame will again be moved away by motor 53.

The closure of contact 28 also closes the circuit of the speed control motor 29 in the proper direction to adjust the governor setting to a higher speed position. Under the conditions of a shut-down such as assumed the governor setting will be adjusted to its highest speed position and then a limit switch, not shown, will open the circuit of the speed control motor 29. The turbine will also be equipped with the usual hand operated throttle valve, such as shown at 68, for starting and stopping purposes, and when the turbine is again started by the opening of this valve it will run at a higher speed than normal because of the high speed setting of the governor 6. The turbo alternator will therefore continue to run above normal speed until the secondary clocks have gained the five minutes lost during the shut-down and pulley 24 has again been raised together with switch arm 25 to close the circuits of motors 29 and 53 at 27. Motor 29 will then gradually readjust the governor to a lower speed setting and the turbine speed will be reduced accordingly. Motor 53 will move contact 27 downward away from lever 25 closing the circuit of motor 54 at 55 which will slowly return the frame 52 back to its central position. If the speed of the synchronous motor 19 is still too high, or if there is still a slight positive accumulated error in frequency, the circuits of motors 29 and 53 will again be closed at 27 and the governor setting again adjusted for lower speed operation. The function of the anti-racing devices which have been previously explained is to prevent an over-travel of the regulating devices without which they would have to be made so sluggish as to seriously interfere with the desirable close speed control of the turbine.

Although my invention is particularly advantageous on systems supplying secondary clocks, it is evident that it could to advantage be applied to regulate the speed of prime movers whether the system is one supplying secondary clocks or not because the master clock controller 8 may be adjusted to respond to minute variations in speed such as would not affect the ordinary speed governor. The same master clock controller 8 may be used to regulate a plurality of prime movers supplying a common system, by providing each of such prime movers with a speed control motor such as shown at 29, all of the speed control motors being connected in parallel. It is also apparent that the master clock controller may be disconnected entirely such as by opening switches 20 and 69 without interfering with the operation of governor 6 and its anti-racing device.

In case it becomes desirable to suspend the operation of the master clock controller the motor 29 may then be used to adjust the setting of the governor, and thus regulate the speed of the turbine, as is often desirable for synchronizing purposes. When so used the motor 29 would be connected to a set of manually controlled contacts located for example on the power house switchboard. Such contacts are shown in Fig. 1 at 70 and it will be apparent that manual control may resorted to within certain limits even though the clock controller is also in operative condition.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In combination a prime mover, a valve for regulating the flow of motive fluid thereto, a speed responsive governor for controlling said valve, means for adjusting the speed setting of said governor and an anti-racing mechanism comprising a dash-pot mechanically connected between said valve and said governor setting means arranged to adjust the same in a direction to check a movement of the valve such as would otherwise cause an over or under speeding of the prime mover.

2. In combination a prime mover, a valve for regulating the flow of motive fluid thereto, a speed responsive governor for controlling said valve, means for adjusting the speed setting of said governor, an anti-racing mechanism including a dash-pot mechanically connected between said valve and speed setting means arranged to move the latter in a direction to check an excessive movement of the valve and means controllable from a distance associated with the mechanical connection for adjusting said speed setting means independently of said anti-racing mechanism.

3. In combination a prime mover, a valve for regulating the flow of motive fluid thereto, a speed responsive governor for controlling said valve, means for adjusting the speed setting of said governor, a mechanical connection including a dash-pot between said valve and speed setting means adapted to move the speed setting means in a direction to check an excessive movement of said valve, and resilient means constrained by such a movement for more slowly returning the speed setting means to its original position.

4. In a regulating system for a prime mover of the type having a valve controlled by a speed responsive governor, means for adjusting the speed setting of said governor comprising a nut, a rack for turning said nut, a pinion for moving said rack, an electric motor controllable from a distance and operating through an irreversible drive for rotating said pinion, said motor and pinion being mounted on a slide, an anti-racing mechanism connected between said slide and the valve of the prime mover, operative upon an excessive movement of the valve, for moving said slide away from a central position in a direction to check such valve movements and resilient means for more slowly returning said slide to its central position without directly moving the valve.

In witness whereof, I have hereunto set my hand this 6th day of December, 1922.

HENRY E. WARREN.